US008085839B2

(12) United States Patent
Shakiba et al.

(10) Patent No.: US 8,085,839 B2
(45) Date of Patent: Dec. 27, 2011

(54) ADAPTIVE EQUALIZATION SYSTEM AND METHOD HAVING A LOCK-UP-FREE QUANTIZED FEEDBACK DC RESTORATION CIRCUIT

(75) Inventors: Mohammad H. Shakiba, Richmond Hill (CA); Eliyahu D. Zamir, Thornhill (CA)

(73) Assignee: Gennum Corporation (CA)

( * ) Notice: Subject to any disclaimer, the term of this patent is extended or adjusted under 35 U.S.C. 154(b) by 980 days.

(21) Appl. No.: 11/960,875

(22) Filed: Dec. 20, 2007

(65) Prior Publication Data

US 2009/0034601 A1 Feb. 5, 2009

Related U.S. Application Data

(60) Provisional application No. 60/953,215, filed on Aug. 1, 2007.

(51) Int. Cl.
*H03D 3/00* (2006.01)
(52) U.S. Cl. ........ 375/232; 375/319; 375/345; 375/358; 455/138; 455/103; 455/251.1; 455/250.1; 455/245.1; 327/307
(58) Field of Classification Search ............... 375/232, 375/319, 328, 345, 358; 327/132, 368, 274, 327/52, 65, 89, 96, 359, 287, 307; 330/259, 330/264, 265, 277; 455/138, 103, 251.1, 455/245.1, 234.1, 240.1–242.2
See application file for complete search history.

(56) References Cited

U.S. PATENT DOCUMENTS

| 4,575,859 | A | * | 3/1986 | Ollendick | ............. 375/318 |
| 5,124,673 | A | * | 6/1992 | Hershberger | ............ 333/18 |
| 5,699,386 | A | * | 12/1997 | Measor et al. | ........... 375/350 |
| 6,304,615 | B1 | * | 10/2001 | Webster | ............. 375/319 |
| 6,463,108 | B1 | | 10/2002 | Shakiba | |
| 6,750,712 | B1 | * | 6/2004 | Hoang | ............. 330/252 |
| 2006/0088089 | A1 | * | 4/2006 | Gondi et al. | ............ 375/232 |
| 2007/0008016 | A1 | * | 1/2007 | Mohammadi et al. | ....... 327/65 |

OTHER PUBLICATIONS

Shakiba, M., "WP 23.3 A 2.5Gb/s Adaptive Cable Equalizer", 1999 IEEE International Solid-State Circuits Conference, 0-7803-5126-6/99, pp. 396, 397 and 483.

* cited by examiner

*Primary Examiner* — Khanh C Tran
*Assistant Examiner* — Rahel Guarino
(74) *Attorney, Agent, or Firm* — Jones Day

(57) ABSTRACT

An adaptive equalizer may include one or more equalizing gain stages coupled to an input signal. An automatic gain control circuit may be used to control the gain of the one or more equalizing gain stages, the automatic gain control circuit having an AGC reference input. A dual-output DC restoration circuit may be coupled to the output of the one or more equalizing gain stages for generating a first output signal using a first hysteresis slicer that DC restores the input signal and for generating a second output signal using a second hysteresis slicer that is coupled to the AGC reference input of the automatic gain control circuit, wherein the second hysteresis slicer introducing less hysteresis than the first hysteresis slicer.

17 Claims, 3 Drawing Sheets

ADAPTIVE EQUALIZATION SYSTEM AND METHOD HAVING A LOCK-UP-FREE QUANTIZED FEEDBACK DC RESTORATION CIRCUIT

CROSS-REFERENCE TO RELATED APPLICATION

This application claims priority from U.S. Provisional Application No. 60/953215, filed on Aug. 1, 2007, the entirety of which is incorporated herein by reference.

FIELD

The technology described in this patent document relates generally to the field of serial digital data communication systems.

BACKGROUND

Serial Digital Interface (SDI) adaptive cable equalizers are known in the art. One example of a known SDI equalizer 10 is illustrated in FIG. 1. The example SDI equalizer 10 includes a plurality of equalizing gain stages 12, an automatic gain control (AGC) feedback loop 14, a quantized feedback (QFB) DC restoration circuit 16, an output buffer 18 and a carrier detect circuit 20.

The plurality of gain stages 12 are gain controlled by the AGC feedback loop 14 to apply an optimum amount of gain to the SDI input signal. In order to adjust the gain to an optimum level, the AGC feedback loop 14 typically compares the output of the gain stages 12 (AGC Input) with a quantized reference signal (AGC Reference) to generate an error signal that is used to adjust the gain of the plurality of gain stages 12.

The QFB DC restoration circuit 16 is used to recover low-frequency components of the SDI input signal. In a serial digital data communication system, low-frequency signal components are often lost when the signal passes through a high-pass filter, such as an AC-coupling network. Due to the wide frequency content of the SDI signal, the AC-coupling removes the low-frequency contents of the signal that could convey useful information. Quantized feedback (QFB) is a well-known and proven technique for implementing a DC-restoration function to recover the low-frequency components of the SDI signal.

As illustrated in FIG. 2, the QFB DC restoration circuit 16 operates by AC coupling (22) the input signal into a slicer 24 that employs a DC feedback loop 26 around itself. A detailed description of a QFB DC restoration circuit is provided in commonly-owned U.S. Pat. No. 6,463,108, titled "Latch-Up Recovery In Quantized Feedback DC Restorer Circuits," which is incorporated herein by reference in its entirety. In operation, the QFB DC restoration circuit 16 introduces a hysteresis when the QFB slices the signal. The hysteresis originates from the feedback around the slicer as shown in FIG. 2. This hysteresis implies a dead zone in the transfer characteristic of the QFB that prevents small signals from being able to pass the threshold levels, trigger the latch, and create fluctuations at the QFB output.

With reference again to FIG. 1, the quantized output of the QFB DC restoration circuit 16 is output through a buffering output stage 18 and is also fed back as a reference signal (AGC Reference) for the AGC loop 14. Even though an independently and internally-generated DC value could be used as the AGC reference signal, it is typically preferred to use the transition amplitudes of the QFB output as the AGC reference because this signal closely matches the launched signal variations and provides the best AGC operation for almost any kind of input signal independent of signal pattern. The drawback of using the QFB output in this manner, however, is that the operation of the AGC loop is made dependant on a reference signal that is only available if an input signal exists and is amplified enough to guarantee signal crossings beyond the QFB dead zone levels caused by the hysteresis. For example, if no signal is applied to the equalizer, then the QFB output becomes silent and therefore does not generate the AGC reference. In this situation, the AGC will wrongly converge the gain to its minimum value in an attempt to match the signal to the reference and force a lock-up situation.

To prevent the lock-up problem explained above, and as shown in the block diagram of FIG. 1, the traditional implementations have added a carrier detect circuit 20 that disables the AGC loop 14 when no signal fluctuations are observed and ramps-up the gain until such fluctuations start to appear. In order for this added functionality to operate properly, however, the detection threshold level of the carrier detect circuitry needs to be above the QFB threshold levels due to the hysteresis. This new requirement imposes more design, characterization, test, field application, and manufacturability constraints, and has shown to be problematic in many practical cases. It is therefore desirable to provide an adaptive equalization system having an improved QFB DC restoration circuit that provides lock-up-free operation without requiring the use of a carrier detect feedback.

DETAILED DESCRIPTION

Figure 3:
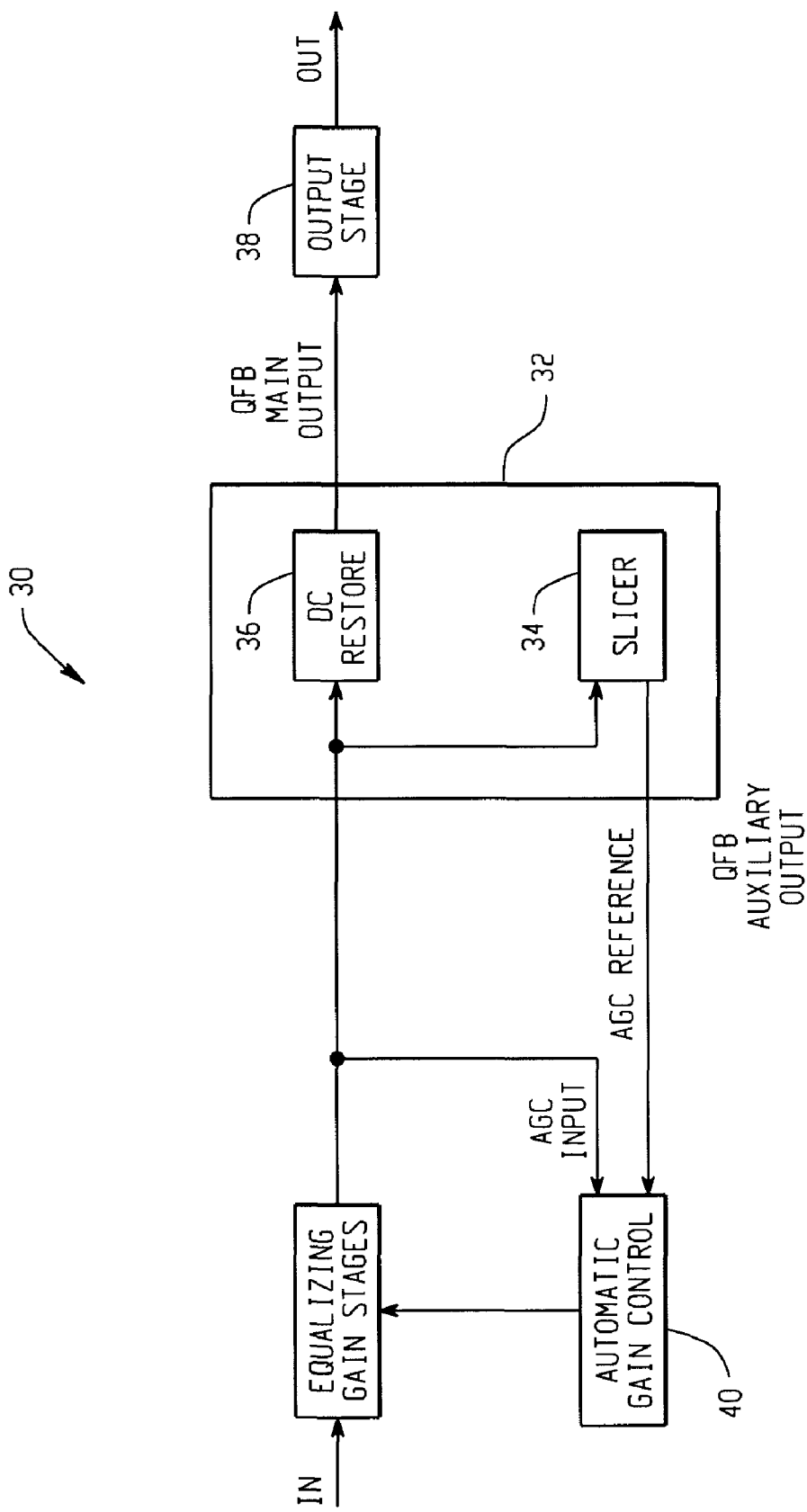
FIG. 3 is a block diagram of an adaptive equalizer system having an improved QFB DC restoration circuit.

FIG. 3 is a block diagram of an adaptive equalization system 30 having an improved QFB DC restoration circuit 32. This example system 30 adds a second slicer circuit 34 to the QFB circuitry 32 that operates in parallel with the main hysteresis slicer 36. The QFB DC restoration circuit 32 thus includes two independent outputs that can be separately used for different purposes. These two outputs are referred to herein as the QFB main output (the output generated by the main hysteresis slicer 36) and the QFB auxiliary output (the output generated by the second slicer circuit 34). In the example shown in FIG. 3, the QFB main output is directed to the equalizer output through the output stage 38, and the QFB auxiliary output is coupled to and used by the AGC loop 40 to generate the AGC reference signal.

In a preferred example, the second slicer circuit 34 is a zero-hysteresis slicer and the main hysteresis slicer 36 is a nonzero-hysteresis slicer. It should be understood that a zero-hysteresis slicer refers to a slicer that introduces either zero hysteresis or that introduces some negligible amount of hysteresis compared to the hysteresis introduced by the nonzero-hysteresis slicer. In other examples, however, the second slicer circuit 34 may also introduce a hysteresis in a similar manner as the DC restoration circuit 32, as long as the hysteresis introduced by the second slicer circuit 34 is less than the hysteresis introduced by the main hysteresis slicer 36.

Figure 1:
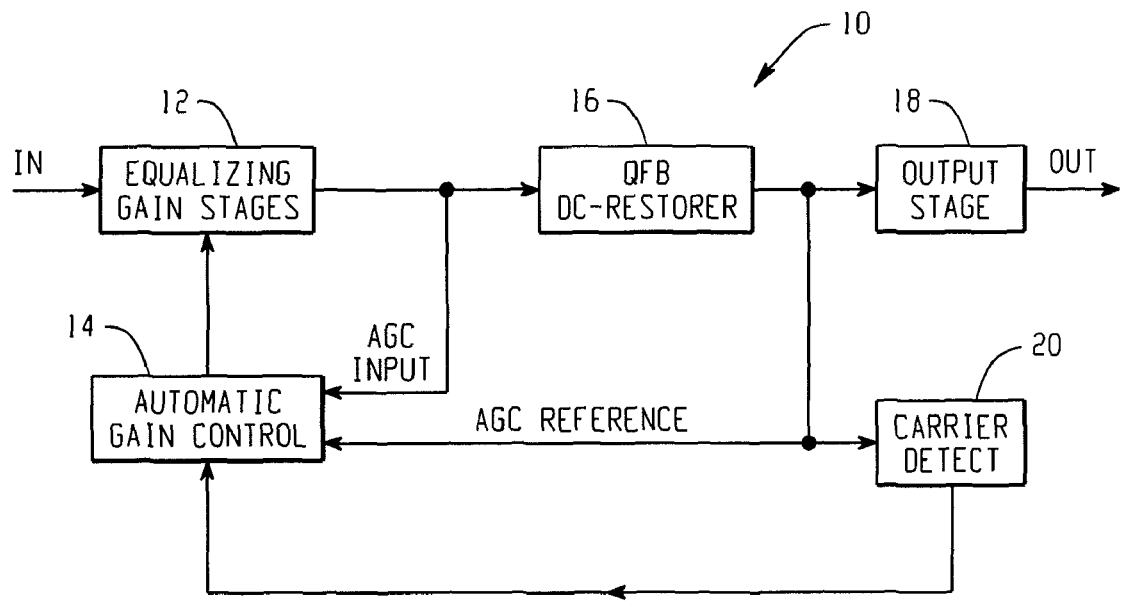
FIG. 1 is a block diagram of a known SDI equalizer.
Figure 2:
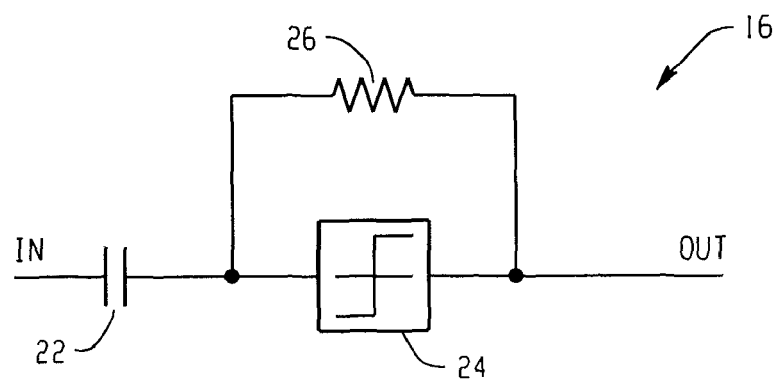
FIG. 2 is a more detailed diagram of the QFB DC restoration circuit of FIG. 1.

An advantage of the adaptive equalization system 30 shown in FIG. 3 is that for the zero-hysteresis slicer 34 to generate transitions, the input signal level does not have to be of the minimum level required by the nonzero-hysteresis slicer 36. As a result, the AGC loop 40 will continue to operate under much weaker input signal conditions without the need for carrier detect circuitry as shown in FIG. 1. In reality, the input signal level can even be of a zero value (corresponding to no input scenario), yet the zero-hysteresis slicer 34 will continue to produce transitions due to the noise present in the system and circuits. The only known obstacle that may stop toggling at the QFB auxiliary output is the offset voltage that is typically much less than the minimum signal level under even a severe and out-of-spec cable attenuation.

The loose correlation between the equalizer input, under low to no signal conditions, and the QFB auxiliary output, that serves as the AGC reference, is not important because as soon as any reference is generated, the AGC loop 40 will force the gain to increase and will force the QFB auxiliary output to become more correlated and eventually almost indistinguishable from the QFB main output. At the converged gain level, the two QFB outputs are only different in their jitter values, which value may be an essential parameter for the main output (and is in fact the driving force behind using a nonzero-slicing technique), but is not important for the purpose of generating the AGC reference signal. This insensitivity becomes more obvious if one considers various filtering acts that take place inside the reference generator, for example as detailed in incorporated U.S. Pat. No. 6,463,108.

Other advantages may also be derived from two separate outputs of the QFB circuitry 32 shown in FIG. 3. For instance, it is known that the performance of the equalizer is improved if the output swing of the QFB is optimized to balance its input swing. It is also known that improved performance results from providing an optimum reference level to the AGC loop 40. Thus, for optimal performance the designer would like to have the flexibility of tuning both of these parameters over the space of operating conditions. The improved QFB DC restoration circuit 32 shown in FIG. 3 enables the designer to independently optimize each of the QFB outputs for their intended function.

Figure 4:
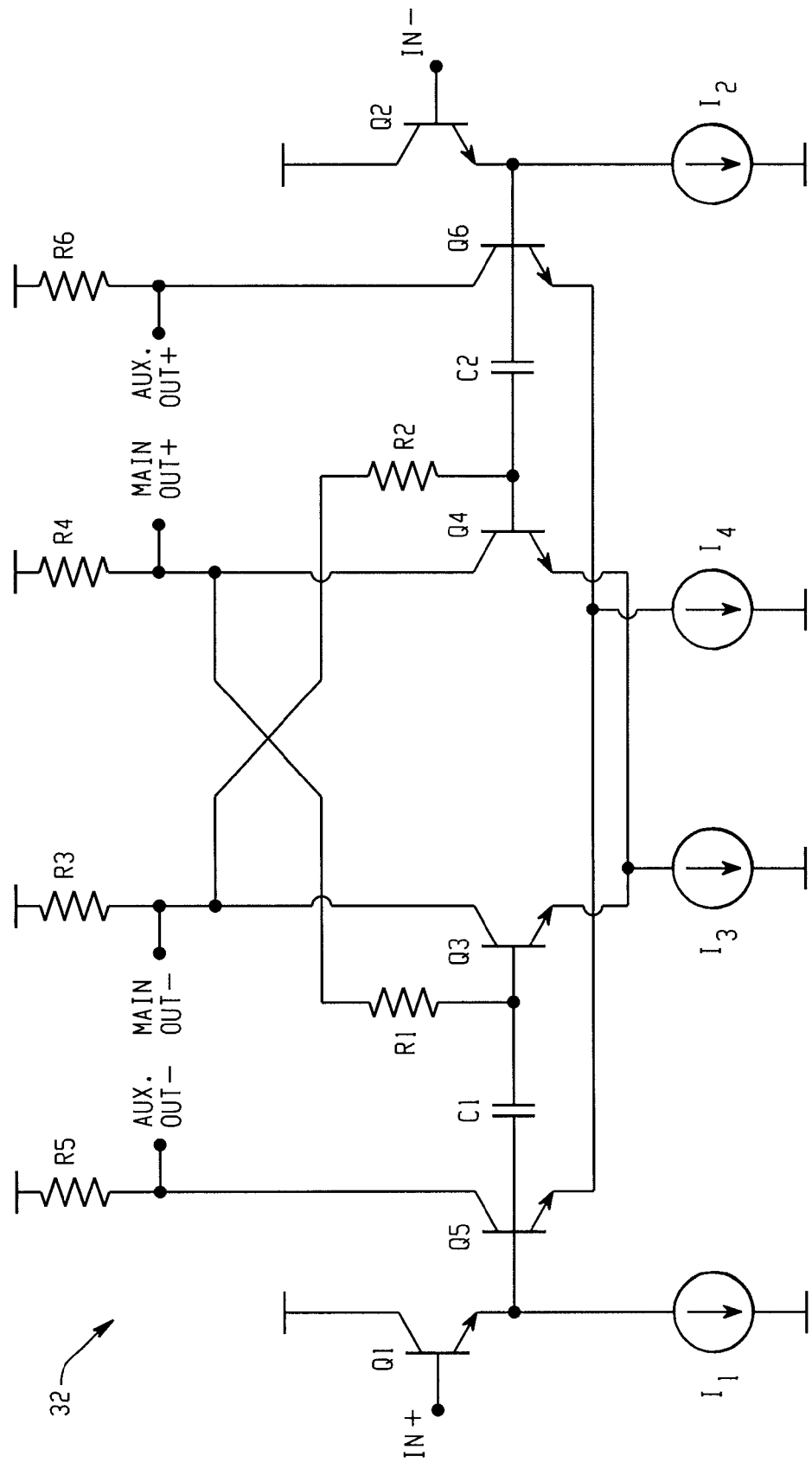
FIG. 4 is a diagram illustrating an example differential circuit implementation of a dual output QFB DC restoration circuit.

FIG. 4 is a circuit diagram illustrating an example differential circuit implementation of the dual output QFB DC restoration circuit 32 shown in FIG. 3. In this exemplary circuit, transistors Q1 and Q2, along with their biasing current sources I1 and I2, are the input buffers that provide adequate buffering at the QFB input. Transistor pair Q3 and Q4 together with their load resistors R3 and R4 and tail current source 13 form the main QFB slicer that is converted to a non-zero hysteresis slicer through the use of feedback resistors R1 and R2. Capacitors C1 and C2 AC-couple the differential input to the main QFB slicer. In addition, transistor pair Q5 and Q6 along with resistors R5 and R6 and tail current source 14 implement the auxiliary zero-hysteresis function.

In circuit shown in FIG. 4, resistors R3 and R4 and/or current source 13 can be set to generate the desired signal swing at the QFB main output, while resistors R5 and R6 and/or current source 14 can be independently set to produce the signal level at the QFB auxiliary output. This independence can be further extended to design the biasing circuits that set the currents 13 and 14 to exhibit different temperature and/or process technology variation coefficients to compensate for any system level variations that may exist, if the designer chooses to do so.

This written description uses examples to disclose the invention, including the best mode, and also to enable a person skilled in the art to make and use the invention. The patentable scope of the invention may include other examples that occur to those skilled in the art. For example, even though bipolar transistors are used in the example illustrated in FIG. 4, other examples may instead include other types of transistors, such as field effect transistors.

It is claimed:

1. An adaptive equalizer, comprising:
   one or more equalizing gain stages coupled to an input signal to be adaptively equalized;
   an automatic gain control circuit for controlling the gain of the one or more equalizing gain stages, the automatic gain control circuit having an AGC reference input; and
   a dual-output DC restoration circuit coupled to the output of the one or more equalizing gain stages;
   the dual-output DC restoration circuit including a first slicer circuit that generates a first output signal to recover low-frequency components of the input signal, the first slicer circuit being configured to introduce a hysteresis in the first output signal;
   the dual-output DC restoration circuit further including a second slicer circuit that generates a second output signal, the second output signal being coupled to the AGC reference input of the automatic gain control circuit, wherein the second slicer circuit is configured to introduce a lesser amount of hysteresis than the hysteresis introduced by the first slicer circuit.

2. The adaptive equalizer of claim 1, wherein the first slicer circuit is a non-zero hysteresis slicer and the second slicer circuit is a zero hysteresis slicer.

3. The adaptive equalizer of claim 1, further comprising an output buffer that buffers the first output signal of the dual-output DC restoration circuit.

4. The adaptive equalizer of claim 1, wherein an output swing of the first output signal of the dual-output DC restoration circuit is tunable independent of the second output signal.

5. The adaptive equalizer of claim 4, wherein the second output signal is tunable independent of the first output signal to adjust a level of the AGC reference input.

6. The adaptive equalizer of claim 1, wherein the output of the one or more equalizing gain stages and the first output signal of the dual-output DC restoration circuit are differential signals.

7. The adaptive equalizer of claim 6, wherein the first slicer circuit includes a differential pair of transistors and a pair of feedback resistors that generate the first output signal.

8. The adaptive equalizer of claim 7, wherein the first slicer circuit further includes a pair of AC-coupling capacitors that couple the differential output of the one or more equalizing gain stages to the differential pair of transistors and the pair of feedback resistors.

9. The adaptive equalizer of claim 7, wherein the first slicer circuit further includes a pair of load resistors coupled to the differential pair of transistors, wherein values of the load resistors are selected to set a desired signal swing of the first output signal.

10. The adaptive equalizer of claim 6, wherein the second output signal of the dual-output DC restoration circuit is also a differential signal.

11. The adaptive equalizer of claim 10, wherein the second slicer circuit includes a differential pair of transistors that generate the second output signal.

12. The adaptive equalizer of claim 11, wherein the second slicer circuit further includes a pair of load resistors coupled to the differential pair of transistors, wherein values of the load resistors are selected to set a desired signal level of the second output signal.

13. The adaptive equalizer of claim 10, wherein the second slicer circuit further includes a tail current source, wherein the tail current source may be adjusted to set a desired signal level of the second output signal.

14. The adaptive equalizer of claim 6, wherein the first slicer circuit further includes a tail current source, wherein the tail current source may be adjusted to set a desired signal swing of the first output signal.

15. A method for adaptively equalizing an input signal, comprising:
   receiving the input signal from a transmission medium;
   applying a gain to the input signal to generate an amplified signal, wherein the gain is controlled using an AGC reference input;
   generating a quantized output signal using a nonzero hysteresis slicer by introducing a hysteresis and slicing the amplified signal to recover low-frequency components of the input signal; and
   generating the AGC reference input using a zero hysteresis slicer by slicing the amplified signal.

16. The method of claim 15, wherein the gain is controlled by comparing the amplified signal with the AGC reference signal.

17. A method for adaptively equalizing an input signal, comprising:
   receiving the input signal from a transmission medium;
   applying a gain to the input signal to generate an amplified signal, wherein the gain is controlled using an AGC reference input;
   generating a quantized output signal by introducing a hysteresis and slicing the amplified signal to recover low-frequency components of the input signal; and
   generating the AGC reference input by slicing the amplified signal;
   wherein the quantized output signal is generated using a first hysteresis slicer and the AGC reference signal is generated using a second non-zero hysteresis slicer, wherein the first hysteresis slicer introduces more hysteresis than the second hysteresis slicer.

* * * * *